3,575,962
Patented Apr. 20, 1971

3,575,962
N'-SUBSTITUTED N-ARYLSULFONYL UREAS
Henri Dietrich, Arlesheim, Switzerland, assignor to Geigy Chemical Corporation, Ardsley, N.Y.
No Drawing. Filed Sept. 13, 1967, Ser. No. 667,363
Int. Cl. C07d 41/08
U.S. Cl. 260—239         17 Claims

ABSTRACT OF THE DISCLOSURE

N - arylsulfonyl-1,2,4,5-tetrahydro-3-H-3-benzazepine-3-carboxamides and pharmaceutically acceptable salts thereof with bases, which compounds have useful hypoglycaemic action, as well as starting materials for their production; therapeutic compositions containing these carboxamides or their pharmaceutically acceptable addition salts and processes of producing hypoglycaemic effects in mammals. An illustrative embodiment is N-(p-tolylsulfonyl) - 1,2,4,5 - tetrahydro-3H-3-benzazepine-3-carboxamide.

---

The invention relates to N'-substituted N-arylsulfonyl ureas having valuable pharmacological properties. More particularly the invention pertains to N-arylsulfonyl-1,2,4,5-tetrahydro-3H-3-benzazepine - 3 - carboxamides and to pharmaceutically acceptable salts thereof with inorganic or organic bases. The invention is further concerned with processes for the production of these carboxamides and these addition salts and also comprehends tetrahydro-3H-3-benzazepine derivatives which are used as starting materials in said processes. It is further an object of the invention to provide therapeutic compositions consisting essentially of (1) a N-arylsulfonyl-1,2,4,5 - tetrahydro-3H-3-benzazepine-3-carboxamide according to the invention, or a pharmaceutically acceptable salt thereof with an inorganic or organic base, and (2) a pharmaceutical carrier. Another object of the invention is to provide processes of producing hypoglycaemic effects in mammals involving the adminisration to said mammals of an effective amount of an inventive N-arylsulfonyl-1,2, 4,5-tetrahydro-3H-3-benzazepine - 3 - carboxamide, or a pharmaceutically acceptable salt thereof with an inorganic or organic base.

Compounds of the formula

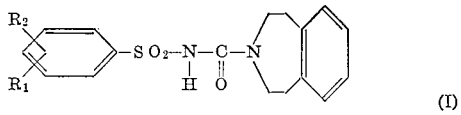

(I)

wherein $R_1$ represents hydrogen, halogen up to the atomic number 35, a lower alkyl, lower alkoxy, lower alkylthio, lower alkanoyl or amino group,
$R_2$ represents hydrogen, or
$R_1R_2$ represents the trimethylene or the tetramethylene group, and their salts with inorganic or organic bases, have not been known up to now.

In the compounds of Formula I, $R_1$ may be in the o-, m- or p-position and may be exemplified by lower alkyl as e.g. methyl, ethyl, n-propyl, isopropyl, n-butyl, isobutyl, sec. butyl, tert. butyl, n-pentyl, isopentyl or 2,2-dimethyl-propyl; for lower alkoxy as e.g. methoxy, ethoxy, n-propoxy, isopropoxy, n-butoxy, isobutoxy, sec. butoxy, tert. butoxy, n-pentoxy, isopentoxy as well as 2,2-dimethylpropoxy; for lower alkylthio as e.g. methylthio, ehtylthio, n-propylthio, isopropylthio, n-butylthio, isobutylthio, sec. butylthio, tert. butylthio, n-pentylthio, isopentylthio as well as 2,2-dimethyl-propylthio and, for lower alkanoyl, as e.g. acetyl, propionyl, 2-methyl-propionyl, butyryl, 2-methyl-butyryl as well as 3-methylbutyryl.

The compounds of the above formula are produced according to the invention by reacting an isocyanate derivative of the Formula II

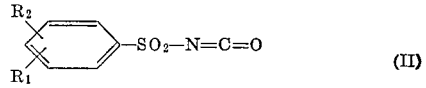

(II)

wherein $R_1'$ represents hydrogen, halogen up to the atomic number 35, the amino group or a lower alkyl, lower alkoxy, lower alkylthio or lower alkanoyl group, or it represents a group which can be converted into an amino group by hydrolysis, reduction or reductive cleavage,
$R_2$ represents hydrogen or
$R_1'R_2$ represents the trimethylene or tetramethylene group, or a reactive functional derivative of a carbamic acid of the Formula III

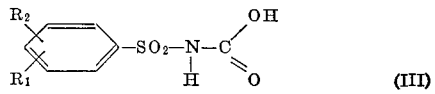

(III)

wherein $R_1'$, $R_2$ or $R_1'R_2$ have the meanings given in Formula I or II, with 1,2,4,5-tetrahydro-3H-3-benzazepine [cf. P. Ruggli et al., Helv. Chim. Acta 18, 1388 (1935)], or with an alkali metal derivative of this compound, the reaction being performed, if desired, in the presence of a condensing agent and, preferably, in an inert solvent, if necessary hydrolysing or reducing the reaction product obtained to convert the group $R_1'$ into the free amino group and, if desired, converting the reaction product obtained into a salt with an inorganic or organic base.

As reactive functional derivatives of carbamic acids of the Formula III, e.g. their halides, particularly the chlorides, and their lower alkyl esters, particularly the methyl or ethyl esters, also the phenyl esters are used. Also, amides, nitroamides, lower alkylamides, di (lower) alkylamides, diphenylamides, particularly N-methylamides, N,N-dimethylamides, in addition N-acylamides such as benzoylamides, and 2-oxo derivatives of polymethyleneimides such as the 2-oxo-derivative of pyrrolidines, piperidides, hexamethyleneimides or octamethyleneimides are suitable.

As example of such functional derivatives of carbamic acids of the Formula III can be mentioned: N-phenylsulfonyl carbamic acid chloride, methyl-, ethyl- or phenyl N-phenylsulfonyl carbamates, N-phenylsulfonyl urea, N - nitro-N'-phenylsulfonyl urea, N-methyl-N'-phenylsulfonyl urea, N,N-dimethyl-N'-phenylsulfonyl urea, N,N-diphenyl-N'-phenylsulfonyl urea, N - benzoyl-N'-phenylsulfonyl urea, N-phenylsulfonyl - 2 - oxo-pyrrolidine-1-carboxamide, N - phenylsulfonyl - 2 - oxo-piperidine-1-carboxamide, N-phenylsulfonyl - 2 - oxo-hexahydro-1H-azepine-1-carboxamide and N - phenylsulfonyl -2 - oxo-octahydro1H-azonine-1-carboxamide, or derivatives of those compounds the groups $R_1'$ or $R_1'R_2$ of which at the benzene nucleus conform with the groups explicitly listed for $R_1$ or $R_1R_2$ at the end of Formula I.

The reaction is performed, e.g. in the cold or by heating in an inert organic solvent. Suitable inert organic solvents are, e.g. hydrocarbons such as benzene, toluene or xylene, ether-type liquids such as diethyl ether, dioxane or tetrahydrofuran, chlorinated hydrocarbons such as methylene chloride and lower ketones such as acetone or methylethyl ketone.

The reaction of an isocyanate, carbamic acid ester or urea can be performed in the absence of solvents or diluents. In general, no condensing agent is necessary; if desired, however, an alkali alcoholate can be used as such agent. Other condensing agents which can be used in the reaction of an isocyanate are tertiary organic bases; isocyanates, however, can also be used in the form of an additional product with a tertiary organic base.

The reaction of a carbamic acid halide with 1,2,4,5-tetrahydro-3H-3-benzazepine is preferably performed according to the invention in the presence of an acid binding agent. As such, inorganic bases or salts are used such as an alkali hydroxide, acetate, hydrogen carbonate, carbonate and phosphate, e.g. sodium hydroxide, sodium acetate, sodium hydrogen carbonate, sodium carbonate and sodium phosphate or the corresponding potassium compounds. In addition, calcium oxide, calcium carbonate as well as calcium phosphate and magnesium carbonate can also be used. Instead of inorganic bases or salts, also organic bases are suitable, e.g. pyridine, trimethylamine or triethylamine, N,N-di-isopropylamine, triethylamine or collidine. Used in excess, these can also serve as solvents. For the reaction according to the invention with a carbamic acid chloride, instead of 1,2,4,5-tetrahydro-3H-3-benzazepine, an alkali metal derivative of this base such as a sodium, potassium, or lithium derivative can be used.

The conversion of a group $R_1'$ of the reaction product into the free amino group which converts such product into a compound of Formula I is performed by hydrolysis, reduction or reductive cleavage depending on the type of the group $R_1'$.

Groups $R_1'$ which can be converted into the free amino group by hydrolysis are, e.g. acylamino, particularly lower alkanoylamino, groups such as the acetamido group or lower alkoxy or phenoxy carbonylamino groups such as the ethoxycarbonylamino or phenoxycarbonylamino group. Other examples are substituted methyleneamino groups such as the benzylideneamino or p-dimethylamino-benzylideneamino group. The hydrolysis to liberate the amino group can be performed, e.g. in acid medium such as by heating in dilute methanolic hydrochloric acid, or, when $R_1'$ is a lower alkoxy or phenoxy carbonylamino group, also under mild alkaline conditions, e.g. with 1 N to 2 N sodium hydroxide solution, at room temperature.

An example of a group $R_1'$ which can be converted by reduction into the amino group is the nitro group and examples of such groups which, by reductive cleavage, lead to the amino group are the phenylazo or p-dimethylamino-phenylazo groups. In general, these groups can be reduced catalytically, e.g. with hydrogen in the presence of Raney nickel, palladium or platinum charcoal, in an inert solvent such as ethanol. In addition, other usual reduction processes can also be used, e.g. the reduction of nitro groups or the reductive cleavage of azo groups with the aid of iron in acetic or hydrochloric acid.

Compounds of the Formula I are produced by a second process according to the invention by reacting a reactive functional derivative of tetrahydro-3H-3-benzazepine-3-carboxylic acid with a sulfonamide of the Formula IV

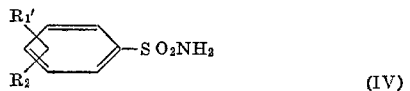

(IV)

wherein $R_1'$, $R_2$ and $R_1'R_2$ have the meanings given in Formula I or II or reacting such tetrahydro-3H-3-benzazepine-3-carboxylic acid derivative with an alkali metal derivative of a compound of Formula IV, if necessary hydrolysing or reducing the reaction product obtained to convert the group $R_1'$ into the free amino group and, if desired, converting the reaction product obtained into a salt with an inorganic or organic base.

The halides, particularly the chloride, are used as reactive functional derivatives of tetrahydro-3H-3-benzazepine-3-carboxylic acid. Suitable alkali metal derivatives of sulfonamides of Formula IV are, e.g. sodium, potassium or lithium derivatives.

The reaction of the halides according to the invention is preferably performed in an inert solvent in the presence of an acid binding agent. Suitable inert organic solvents are, e.g. hydrocarbons such as benzene, toluene or xylene, ethereal liquids such as diethyl ether, dioxane or tetrahydrofuran, chlorinated hydrocarbons such as methylene chloride and lower ketones such as acetone or methylethyl ketone. Inorganic bases or salts are used as acid binding agents, e.g. an alkali hydroxide, acetate, hydrogen carbonate, carbonate and phosphate, such as sodium hydroxide, sodium acetate, sodium hydrogen carbonate, sodium carbonate and sodium phosphate or the corresponding potassium compounds. Also calcium oxide, calcium carbonate and calcium phosphate and magnesium carbonate can be used. Instead of inorganic bases or salts, also organic bases are suitable, e.g. pyridine, trimethylamine or triethylamine, N,N-di-isopropylamine, triethylamine or collidine. Used in excess, these can also be used as solvents.

The subsequent conversion of a group $R_1'$ in the reaction product into the free amino group, which converts the reaction product into a compound of Formula I is performed by hydrolysis, reduction or reductive cleavage as described above depending on the type of the group $R_1'$.

Tetrahydro-3H-3-benzazepine-3-carbonyl chloride is an example of a reactive functional derivative of tetrahydro-3H-3-benzazepine-3-carboxylic acid which can be used as starting material. This starting compound which is obtained, e.g. when tetrahydro-3H-3-benzazepine is reacted with phosgene in benzene, is new and forms part of the invention.

Compounds of Formula I are produced by a third process according to the invention by desulfurising a thiourea derivative of the Formula V

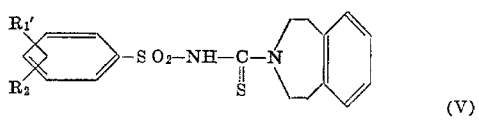

(V)

wherein $R_1'$, $R_2$ or $R_1'R_2$ have the meanings given in Formula I or II, if necessary, hydrolysing or reducing the reaction product obtained to convert the group $R_1'$ into the free amino group and, if desired, converting the reaction product obtained into a salt with an inorganic or organic base.

The desulfurisation can be performed, e.g. with an oxidising agent in acid, alkaline or neutral medium. Suitable oxidising agents are, e.g. potassium ferricyanide, iron-III-chloride, potassium permanganate, potassium chlorate, potassium hypochlorite or potassium hypoiodite solution. Hydrogen peroxide or sodium peroxide in alkaline solution, e.g. sodium hydroxide solution, are particularly advantageous oxidising agents. In addition, heavy metal compounds such as mercury oxide or lead oxide can also be used for the desulfurisation. These metal oxides are advantageously used in an aqueous organic solvent. Suitable organic solvents are, e.g. lower alkanols such as methanol, alkane polyols such as glycol or glycerine, ethereal liquids such as tetrahydrofuran or dioxan, ketones such as acetone or methylethyl ketone, carboxylic acid amides such as N,N-dimethylformamide and, also, urea derivatives such as 1,1,3,3-tetramethyl-urea.

The subsequent conversion of a group $R_1'$ in the reaction product into the free amino group which converts the product into a compound of Formula I can be performed as described at the end of the first process. The hydrolysis of group $R_1'$ to the amino group there mentioned, however, can also be performed simultaneously with the desulfurisation.

Starting materials of the Formula V are, e.g. those compounds the substituents $R_1'$ and $R_2$ of which conform to the groups listed at the end of Formulae I or II for $R_1$, $R_2$ or $R_1R_2$, or $R_1'$, $R_2$ or $R_1'R_2$ respectively. These starting materials are new and form part of the invention. An example of such a starting material is N-(p-tolylsulfonyl)-1,2,4,5-tetrahydro-3H - 3 - benzazepine-3-thiocarboxamide which can be produced, e.g. from p-tolylsulfonyl isothiocyanate and tetrahydro-3H - 3 - benzazepine in toluene. Other starting materials of this type can be produced analogously.

Compounds of the Formula I according to the invention are produced by a fourth process by hydrolysing a compound of the Formula VI

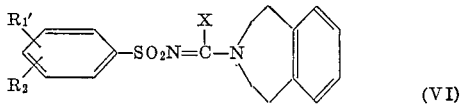
(VI)

wherein $R_1'$, $R_2$ or $R_1'R_2$ have the meanings given in Formulae I or II and X represents a halogen atom or a lower alkoxy or lower alkythio group, if necessary reducing or further hydrolysing the reaction product obtained to convert the group $R_1'$ into the free amino group and, if desired, converting the reaction product obtained into a salt with an inorganic or organic base.

X as a halogen atom preferably represents the chlorine atom, as lower alkoxy or lower alkythio group it represents, e.g. the methoxy, ethoxy or the methylthio or ethylthio group.

When X is a halogen atom, the hydrolysis is advantageously performed with the aid of an inorganic base, e.g. with sodium hydroxide, and when X is a lower alkoxy or lower alkylthio group, instead of the inorganic base, a halogen hydracid, e.g. hydrochloric acid is used. The reaction is advantageously performed in an organic solvent which is miscible with water. Such solvents are, e.g. ketones such as acetone or methylethyl ketone, ether type liquids such as dioxane or tetrahydrofuran and also carboxylic acid amides such as N,N-dimethyl formamide.

The subsequent conversion of a group $R_1'$ in the reaction product into the free amino group can be performed as described at the end of the first process. If the substituent $R_1'$ can be converted into the amino group by hydrolysis then this hydrolysis can be performed simultaneously to the reaction according to the invention.

Starting materials of Formula VI are, e.g. those compounds the substituents $R_1'$ and $R_2$ of which conform to the groups listed following Formulae I and II $R_1$, $R_2$ or $R_1R_2$, or $R_1'$, $R_2$ or $R_1'R_2$, respectively. Such a group of starting materials are, e.g. N-phenylsulfonyl-tetrahydro-3H-3-benzazepine-3-carboximidoyl chlorides substituted in the benzene ring by $R_1'$ and $R_2$. These are obtained, e.g. from phosgene and correspondingly substituted N-phenylsulfonyl-tetrahydro-3H - 3 - benzazepine - 3 - thiocarboxamides, which are starting materials for the third process. The reaction can be performed, e.g. in tetrahydrofuran. The reaction products can be converted into another group of starting materials of the Formula VI wherein the substituent X is a lower alkythio group if they are reacted, e.g. with the sodium salt of a lower alkane thiol such as methane thiol. This second group of starting materials are N-phenylsulfonyl-tetrahydro-3H-3-benzazepine-3-thiocarboximido acid lower alkyl esters, e.g. N-phenylsulfonyl-tetrahydro-3H-3-benzazepine - 3 - thiocarboximido acid methyl esters which are substituted in the benzene nuclei by the groups $R_1'$ and $R_2$. Corresponding N-phenylsulfonyl-tetrahydro-3H-3-benzazepine-3-carboximido acid lower alkyl esters—compounds of Formula VI wherein X is a lower alkoxy group—are obtained, e.g. by using a sodium salt of a lower alkanol as reaction component in the reaction instead of a sodium salt of a lower alkane thiol.

The same starting materials can also be produced starting from tetrahydro-3H-3-benzazepine. This is converted with, e.g. cyanogen bromide, into tetrahydro-3H-3-benzazepine-3-carbonitrile which is converted in a solution of hydrochloric acid in a lower alkanol into a 2-lower alkyl-3-(tetrahydro-3H-3-benzazepin - 3 - yl)pseudo urea. This pseudo urea can be condensed, e.g. with a benzene sulfochloride substituted by the groups $R_1'$ and $R_2$ while splitting off hydrogen chloride.

The above described starting materials of Formula VI are new and form a part of the invention.

As stated above, the invention also concerns the conversion of the N-arylsulfonyl-1,2,4,5-tetrahydro - 3H - 3-benzazepine-3-carboxamides into salts with inorganic or organic bases. These salts have the same valuable pharmacological properties as the free compounds of Formula I and can be prepared according to the usual methods well known in the art. Inorganic or organic bases such as alkali or alkaline earth hydroxides, carbonates or bicarbonates, triethanolamine, choline, $N^1$-dimethyl- or $N^1$-($\beta$-phenylethyl)-biguanide, can be used for example for salt formation.

The N-arylsulfonyl-1,2,3,4,5-tetrahydro - 3H - 3- benzazepine-3-carboxamides of Formula I as well as their pharmaceutically acceptable salts with inorganic or organic bases have now been found to unexpectedly exhibit valuable pharmacological properties. On oral or parenteral administration they show hypoglycaemic action which characterises them as suitable for the treatment of diabetes.

Representative of these compounds are particularly

N-phenylsulfonyl-1,2,4,5-tetrahydro-3H-3-benzazepine-3-carboxamide,
N-(p-tolylsulfonyl)-1,2,4,5-tetrahydro-3H-3-benzazepine-3-carboxamide,
N-(p-chloro-phenylsulfonyl)-1,2,4,5-tetrahydro-3H-3-benzazepine-3-carboxamide,
N-(p-fluoro-phenylsulfonyl)-1,2,4,5-tetrahydro-3H-3-benzazepine-3-carboxamide,
N-(p-methoxy-phenylsulfonyl)-1,2,4,5-tetrahydro-3H-3-benzazepine-3-carboxamide,
N-(p-ethoxy-phenylsulfonyl)-1,2,4,5-tetrahydro-3H-3-benzazepine-3-carboxamide,
N-(p-amino-phenylsulfonyl)-1,2,4,5-tetrahydro-3H-3-benzazepine-3-carboxamide,
N-(p-acetyl-phenylsulfonyl)-1,2,4,5-tetrahydro-3H-3-benzazepine-3-carboxamide,
N-(p-methylthio-phenylsulfonyl)-1,2,4,5-tetrahydro-3H-3-benzazepine-3-carboxamide,
N-(o-tolylsulfonyl)-1,2,4,5-tetrahydro-3H-3-benzazepine-3-carboxamide,
N-(m-chloro-phenylsulfonyl)-1,2,4,5-tetrahydro - 3H - 3-benzazepine-3-carboxamide, and
N-(indan-5-yl-sulfonyl)-1,2,4,5-tetrahydro-3H-3-benzazepine-3-carboxamide, as well as the pharmaceutically acceptable salts thereof with inorganic or organic bases.

Particularly interesting compounds according to the invention which exhibit hypoglycaemic action to a favorable degree are N-arylsulfonyl-1,2,4,5-tetrahydro-3H-3-benzazepine-3-carboxamides of the formula

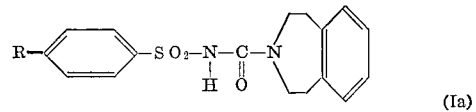
(Ia)

wherein R has the meaning as given in Formula I for $R_1$, as well as the pharmaceutically acceptable salts thereof with inorganic or organic bases.

The hypoglycaemic action of the compounds according to the invention may illustratively be demonstrated e.g. by means of the following test:

The substance to be tested for hypoglycaemic action is suspended in tap water with the aid of tragacanth and is administered by means of a stomach sound. Five rats of an average weight of 190 g. which have not been fed for 6½ hours before the start of the test, and/or six rabbits of an average weight of 2.5 kg. which have not been fed for 24 hours before the start of the test, are used as test animals Blood samples are taken from the tail vein of the animals when using rats in the test, and from the ear vein of the animals when using rabbits, immediately before, and, in intervals, up to 24 hours after, administration of the test substance. The blood sugar is determined according to Hagedorn-Jensen, Biochemische Zeitschrift 135, 46 (1923), and, with the auto-analyser, according to W. S. Hoffman, J. Biol. Chem. 120, 51 (1937), respectively.

N-(p-tolylsulfonyl)-1,2,4,5-tetrahydro-3H-3 - benzazepine-3-carboxamide administered in this test in amounts of from 20 to 100 mg./kg. of bodyweight in the rabbit causes a significant, long lasting reduction of the blood sugar.

On administration of 100 mg./kg. of bodyweight, N-(p-methylthiophenylsulfonyl)-1,2,4,5-tetrahydro-3H-3 - benzazepine-3-carboxamide shows in this test a significant reduction of the blood sugar in the rat.

The compounds of the invention have a favorable therapeutic index, their toxicity is low: the $LD_{50}$ of e.g. N-(p-chloro-phenylsulfonyl)-1,2,4,5-tetrahydro - 3H - 3- benzazepine-3-carboxamide in the mouse is 2400 mg./kg. p.o.

For their intended use the N-arylsulfonyl-1,2,4,5-tetrahydro-3H-3-benzazepine-2-carboxamides of Formula I as well as their pharmaceutically acceptable salts with inorganic or organic bases are administered, preferably, orally in amounts depending on the species, age and weight of the subject under treatment; in general the daily doses vary between about 100 mg. and about 2000 mg.

For administration purposes, preferably, the above mentioned therapeutic compositions are used. These compositions are presented for e.g. oral administration in dosage units such as tablets, dragees (sugar coated tablets), and the like.

Dosage units such as dragees (sugar coated tablets), tablets, preferably contain 100–500 mg. of an active substance according to the invention, i.e. 20–80% of a compound of Formula I. They are produced, e.g. by combining the active substance with, e.g. solid pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols of suitable molecular weights, to form tablets or dragee cores. The latter are coated, e.g. with concentrated sugar solutions which can also contain, e.g. gum arabic, talcum and/or titanium dioxide, or with a lacquer dissolved in easily volatile organic solvents or mixture of solvents. Dyestuffs can be added to these coatings, e.g. to distinguish between varying dosages of active substance.

The following prescriptions further illustrate the production of tablets and dragees:

(a) 1000 g. of N-(p-tolylsulfonyl)-1,2,4,5-tetrahydro-3H-3-benzazepine-3-carboxamide are mixed with 550 g. of lactose and 292 g. of potato starch, the mixture is moistened with an aqueous solution of 8.0 g. of gelatine and granulated through a sieve. After drying, 60.0 g. of potato starch, 60.0 g. of talcum, 10.0 g. magnesium stearate and 20.0 g. of colloidal silicon dioxide are mixed in and the mixture is pressed into 10,000 tablets each weighing 200 mg. and containing 100 mg. of active substances. If desired, the tablets can be grooved for better adaptation of the dosage.

(b) A granulate is prepared from 1000 g. of N-(p-methylthiophenylsulfonyl)-1,2,4,5-tetrahydro-3H-3 - benzazepine-3-carboxamide, 379 g. of lactose and the aqueous solution of 6.0 g. of gelatine. After drying, the granulate is mixed with 10.0 g. of colloidal silicon dioxide, 40.0 g. of talcum, 60.0 g. of potato starch and 5.0 g. of magnesium stearate and the mixture is pressed into 10,000 dragee cores. These are then coated with a concentrated syrup made from 533.5 g. of crystallised saccharose, 20.0 g. of shellac, 75.0 g. of gum arabic, 250 g. of talcium, 20 g. of colloidal silicon dioxide and 1.5 g. of dyestuff, and dried. The dragees obtained each weigh 240 mg. and contain 100 mg. of active substance.

The following examples further illustrate the production of the new compounds of Formula I and of hitherto undescribed intermediate products, but they are by no means the only methods of producing same. The temperatures are given in degree centigrade. Percentages are given by weight.

EXAMPLE 1

14.7 g. of 1,2,4,5-tetrahydro-3H-3-benzazepine (cf. P. Ruggli et al., Helv. Chim. Acta 18, 1388 (1935)) in 50 ml. of anhydrous acetone are added to 20 g. of p-tolyl sulphonyl isocyanate in 150 ml. of acetone. The crude product crystallises out of the reaction solution. The solution is diluted with 200 ml. of water, the crystals are filtered off under suction and taken up in 2 N ammonia. An insoluble residue is filtered off and the clear solution is added dropwise to 2 N hydrochloric acid while stirring and cooling. The crude N-(p-tolylsulphonyl)-1,2,4,5-tetrahydro-3H-3-benzazepine-3-carboxamide precipitates from the solution. It is filtered off under suction, washed with water and dried in vacuo at 60° whereupon it melts at 158.5–160°. The substance crystallises from a small amount of methanol and it decomposes at 101°. The crystals contain methanol.

EXAMPLE 2

14.7 g. of 1,2,4,5-tetrahydro - 3H - 3 - benzazepine are added to 18.3 g. of phenylsulphonyl isocyanate in 100 ml. of anhydrous toluene. An exothermic reaction occurs on completion of which the precipitated crystals are filtered off under suction and washed with petroleum ether. The crystals are dissolved in 150 ml. of cold acetone and a small residue is removed from the solution by filtration. The filtrate is concentrated to half its volume and is diluted with water until it begins to go opaque. The precipitated crystalline end product is filtered off under suction, washed with water and dried in vacuo at 60°. The N-phenylsulphonyl-1,2,4,5-tetrahydro - 3H - 3-benzazepine-3-carboxamide obtained melts at 176–179°.

EXAMPLE 3

Starting from 14.7 g. of 1,2,4,5 - tetrahydro - 3H - 3-benzazepine, following end products are obtained analogously to Example 2:

(a) With 22 g. of p-chlorophenylsulphonyl isocyanate, N-(p-chlorophenylsulphonyl)-1,2,4,5-tetrahydro - 3H - 3-benzazepine-3-carboxamide, M.P. 166.5–168°, (b) With 20.1 g. of p-fluorophenylsulphonyl isocyanate, N-(p-fluorophenylsulphonyl) - 1,2,4,5 - tetrahydro - 3H-3-benzazepine-3-carboxamide, M.P. 101–103°, and (c) With 28.4 g. of p-nitrophenylsulphonyl isocyanate, the new intermediate N-(p-nitrophenylsulphonyl-1,2,4,5-tetrahydro-3H-3-benzazepine-3-carboxamide, M.P. 203–208°. This is hydrogenated in 300 ml. of methanol and 4 g. of platinum charcoal at room temperature and under normal pressure to form N-(p-amino-phenylsulphonyl)-1,2,4,5-tetrahydro-3H-3-benzazepine-3-carboxamide.

EXAMPLE 4

24.3 g. of ethyl N-(p-tolylsulphonyl)-carbamate and 14.7 g. of 1,2,4,5-tetrahydro-3H-3-benzazepine in 400 ml. of anhydrous dioxane are boiled for 3.5 hours. The solution is then concentrated under vacuum and the residue is recrystallised from ethyl acetate. The N-(p-tolyl-sulphonyl) - 1,2,4,5 - tetrahydro - 3H - 3 - benzazepine-3-carboxamide obtained melts at 158.5–160° and, according to its melting point and the melting point when mixed with the compound obtained according to Example 1, it is identical with that compound.

EXAMPLE 5

The following end products are obtained analogously to Example 4 starting from 14.7 g. of 1,2,4,5-tetrahydro-3H-3-benzazepine:

(a) With 25.9 g. of ethyl N-(p-methoxy-phenylsulphonyl)-carbamate, N-(p-methoxy-phenylsulphonyl) - 1,2,4,5-tetrahydro 3H - 3-benzazepine-3-carboxamide, M.P. 150–152°, and (b) With 27.3 g. of ethyl N-(p-ethoxy-phenylsulphonyl)-carbamate, N - (p - ethoxy-phenylsulphonyl)-1,2,4,5,- tetrahydro-3H-3-benzazepine - 3 - carboxamide, M.P. 171–172°.

EXAMPLE 6

14.7 g. of 1,2,4,5-tetrahydro-3H-3-benzazepine and 21.5 g. of sulphanilyl urea are refluxed in 1000 ml. of dioxane, ammonia being developed. After 1 hour, the reaction mixture is concentrated and 200 ml. of water are added. The crystals obtained are dissolved in 2 N ammonia. The filtered solution is acidified with 2 N hydrochloric acid while stirring and cooling. The pure N-(p-amino-phenylsulphonyl)-1,2,4,5-tetrahydro-3H-3-benzazepine - 3 - carboxamide is filtered off under suction, washed with water and dried in vacuo at 60°. It melts at 182–183°.

EXAMPLE 7

23 g. of (p-methoxy-phenylsulphonyl)-urea and 14.7 g. of 1,2,4,5-tetrahydro-3H-3-benzazepine in 100 ml. of anhydrous dioxane are refluxed for 1 hour while stirring vigorously, ammonia being developed. After evaporating the reaction mixture in vacuo, the residue is recrystallised from ethyl acetate. The N-(p-methoxy-phenylsulphonyl)-1,2,4,5-tetrahydro-3H-3-benzazepine - 3 - carboxamide obtained melts at 150–152°. According to its melting point and the melting point when mixed with the compound obtained according to Example (5a), it is identical with that compound.

EXAMPLE 8

Starting from 14.7 g. of 1,2,4,5-tetrahydro-3H-3-benzazepine, the following end products are obtained analogously to Example 7:

(a) With 24.4 g. of (p-ethoxy-phenylsulphonyl)-urea, N - (p - ethoxyphenylsulphonyl) - 1,2,4,5-tetrahydro-3H-3-benzazepine-3-carboxamide, M.P. 171–172°. According to its melting point and the melting point when mixed with the compound obtained according to Example 5(b), it is identical with that compound;

(b) With 24.2 g. of (p-acetyl-phenylsulphonyl)-urea, N - (p-acetylphenylsulphonyl) - 1,2,4,5 - tetrahydro-3H-3-benzazepine-3-carboxamide;

(c) With 21.8 g. of (p-fluorophenylsulphonyl)-urea, N-(p - fluorophenylsulphonyl) - 1,2,4,5 - tetrahydro - 3H-3-benzazepine-3-carboxamide. According to its melting point and the melting point when mixed with the compound obtained according to Example 3(b), it is identical with that compound;

(d) With 23.7 g. of (m-chlorophenylsulphonyl)-urea, N - (m - chlorophenylsulphonyl) - 1,2,4,5 - tetrahydro-3H-3-benzazepine-3-carboxamide, M.P. 134–137°;

(e) With 24.6 g. of (p-methylthio-phenylsulphonyl)-urea, N - (p - methylthio - phenylsulphonyl)-1,2,4,5-tetrahydro-3H-3-benzazepine-3-carboxamide, M.P. 140–150°;

(f) With 24 g. of (indan-5-ylsulphonyl)-urea, N-(indan - 5 - yl - sulphonyl) - 1,2,4,5 - tetrahydro - 3H-3-benzazepin-3-carboxamide, and (g) with 21.4 g. of (o-tolylsulphonyl)-urea, N-(o-tolylsulphonyl) - 1,2,4,5 - tetrahydro - 3H - 3 - benzazepine-3-carboxamide, M.P. 169–171°.

EXAMPLE 9

15.3 g. of 1,2,4,5-tetrahydro-3H-3-benzazepine and 25.6 g. of 1-acetyl-3-(p-tolylsulphonyl)-urea are refluxed for 1 hour in 1000 ml. of anhydrous dioxane while stirring vigorously. The reaction mixture is then concentrated, water is added, the crystalline crude product is filtered off under suction and washed with water. The crude product is recrystallised from ethyl acetate whereupon pure N-(p-tolylsulphonyl)-1,2,4,5-tetrahydro-3H-3 - benzazepine - 3-carboxamide is obtained. According to its melting point and the melting point when mixed with the compound obtained according to Example 1, it is identical with that compound.

EXAMPLE 10

Starting from 14.7 g. of 1,2,4,5-tetrahydro-3H-3-benzazepine, the following end products are obtained analogously to Example 9:

(a) With 28.2 g. of N-(p-tolylsulphonyl)-2-oxo-pyrrolidine-1-carboxamide (M.P. 145–147°) or with 29.6 g. of N-(p-tolylsulphenyl)-2-oxo-piperidine-1-carboxamide, (M.P. 106–107°), N-(p-tolylsulphonyl)-1,2,4,5-tetrahydro-3H-3-benzazepine-3-carboxamide. According to its melting point and the melting point when mixed with the compound obtained according to Example 1, it is identical with that compound;

(b) With 31.7 g. of N-(p-chlorophenylsulphonyl)-2-oxo-piperidine-1-carboxamide (M.P. 138–140°) or with 35.9 g. of N-(p-chlorophenylsulphonyl)-2-oxo-octahydro-1H-azonine-1-carboxamide, N - (p - chlorophenylsulphonyl)-1,2,4,5-tetrahydro-3H-3-benzazepine - 3 - carboxamide. According to its melting point and the melting point when mixed with the compound obtained according to Example 3(a), it is identical with that compound, and (c) With 31.7 g. of N-(p-chlorophenylsulphonyl)-2-oxo-hexahydro-1H-azepine - 1 - carboxamide (M.P. 120–121.5°), N-(p-chlorophenylsulphonyl)-1,2,4,5-tetrahydro-3H-3-benzazepine-3-carboxamide, which is identical with the compound obtained according to Example 10(b).

EXAMPLE 11

(a) 17.1 g. of p-toluene sulphonamide are dissolved in 600 ml. of dioxane and 5.6 g. of pulverised potassium hydroxide are added. 21.0 g. of tetrahydro-3H-3-benzazepine-3-carboxyl chloride are added dropwise to the clear, hot solution and the whole is refluxed for 10 hours. The reaction mixture is then concentrated in vacuo and 150 ml. of 2 N hydrochloric acid are added. The crystals obtained are dissolved in dilute ammonia, a small amount of an undissolved substance is filtered off and the filtrate is again acidified with dilute hydrochloric acid. The precipitated crystals are washed with water. After drying at 60° under vacuum, pure N-(p-tolylsulphonyl)-tetrahydro-3H-3-benzazepine-3-carboxamide melts at 167.5–169° and is identical with the compound obtained by Examples 1 or 4.

The starting material, tetrahydro-3H-3-benzazepine-3-carbonyl chloride, is produced as follows:

(b) 76.2 g. (0.5 mol) of tetrahydro-3H-3-benzazepine are dissolved in 200 ml. of anhydrous benzene and then, at room temperature, phosgene is introduced while stirring. The temperature rises to 60° and the tetrahydro-3H-3-benzazepine hydrochloride crystallises out. Excess phosgene is removed in a stream of nitrogen. The tetrahydro-3H-3-benzazepine hydrochloride (M.P. 214–215°) is then filtered off and the residue is distilled. The tetrahydro-3H-3-benzazepine-3-carbonyl chloride is used without purification.

EXAMPLE 12

Starting from 21.0 g. of tetrahydro-3H-3-benzazepine-3-carbonyl chloride, the following end products are obtained analogously of Example 11(a):

(a) With 19.4 g. of p-chlorobenzene sulphonamide, N-(p-chlorophenylsulphonyl)-tetrahydro - 3H - 3 - benzazepine-3-carboxamide, M.P. 166–168°;

(b) With 23.6 g. of p-bromobenzene sulphonamide, N-(p-bromophenylsulphonyl)-tetrahydro - 3H - 3 - benzazepine-3-carboxamide, (c) With 20.1 g. of p-ethoxybenzene sulphonamide, N-(p-ethoxyphenylsulphonyl)-tetrahydro-3H - 3 - benzazepine-3-carboxamide, M.P. 171–172°;

(d) With 18.7 g. of p-methoxybenzene sulphonamide, N-(p-methoxyphenylsulphonyl)-tetrahydro-3H - 3 - benzazepine-3-carboxamide, M.P. 150–152°.

(e) With 19.7 g. of 5-indane sulphonamide, N-(indan-5-ylsulphonyl)-tetrahydro-3H-3-benzazepine - 3 - carboxamide, and (f) With 17.5 g. of p-fluorobenzene sulphonamide, N-(p-fluorophenylsulphonyl)-tetrahydro-3H - 3 - benzazepine-3-carboxamide, M.P. 101–103°.

EXAMPLE 13

(a) 36.1 g. of N-(p-tolylsulphonyl—tetrahydro-3H-3-benzazepine-3-thiocarboxamide are dissolved in 100 ml. of 2 N sodium hydroxide solution and 50 ml. of 30% hydrogen peroxide are added dropwise while stirring. The reaction mixture is refluxed for 3 hours. Then, after cooling, it is acidified with 2 N hydrochloric acid. The crude product precipitates; it is filtered off and recrystallised from ethyl acetate whereupon N-(p-tolylsulphony)-tetrahydro-3H-3-benzazepine-3-carboxamide is obtained, M.P. 158–160°.

(b) The starting material, N-(p-tolylsulphonyl)-tetrahydro-3H-3-benzazepine-3-thiocarboxamide, is produced as follows: 21.3 g. of p-tolylsulphonyl isothiocyanate are added to 14.7 g. of tetrahydro-3H-3-benzazepine in 50 ml. of anhydrous toluene. On completion of the strongly exothermic reaction, petroleum ether is added to the reaction product until it begins to turn opaque whereupon the substance crystallises. The pure N-(p-tolylsulphonyl)-tetrahydro-3H-3-benzazepine-3-thiocarboxamide melts at 129–130°, solidifies and melts at 210°.

EXAMPLE 14

(a) 36.3 g. of N-(p-tolylsulphonyl)-tetrahydro-3H-3-benzazepine-3-carboximidoyl chloride are dissolved in 200 of dioxane, 200 ml. of 2 N sodium hydroxide are added and the whole is heated for 1 hour in a water bath. After cooling, the reaction mixture is acidified with 2 N hydrochloric acid. The precipitated crystals are recrystallised from ethyl acetate. The pure N-(p-olylsulphonyl)-tetrahydro-3H-3-benzazepine-3-carboxamide melts at 158–160°.

The starting material, N-(p-tolylsulphonyl)-tetrahydro-3H-3-benzazepine-3-carboximidoyl chloride, is produced as follows:

(b) Phosgene is introduced for 5 hours into a solution of 36.1 g. of N-(p-tolylsulphonyl)-tetrahydro-3H-3-benzazepin -3-thiocarboxamide in 500 ml. of anhydrous tetrahydrofuran. The reaction is slightly exothermic. Excess phosgene is then removed with nitrogen and the solution is evaporated in vacuo. The residue is crystallised from ethyl acetate whereupon pure N-(p-tolylsulphonyl)-tetrahydro-3H-3-benzazepine-3-carboximidoyl chloride is obtained.

What is claimed is:

1. A compound selected from the group consisting of a sulfonylurea of the formula:

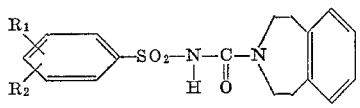

wherein $R_1$ is hydrogen, halogen up to the atomic number 35, lower alkyl, lower alkoxy, lower alkylthio, lower alkanoyl or amino, $R_2$ is hydrogen, or $R_1$ and $R_2$ together is trimethylene or tetramethylene, and the pharmaceutically acceptable salts thereof with an inorganic or organic base.

2. A compound according to claim 1 wherein said sulfonylurea is of the formula:

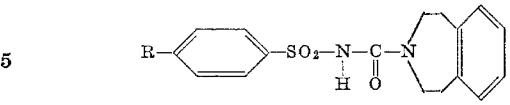

wherein R is as therein defined for $R_1$.

3. A compound as defined in claim 2 wherein said sulfonylurea is N-phenylsulfonyl-1,2,4,5-tetrahydro-3H-3-benzazepine-3-carboxamide.

4. A compound as defined in claim 2 wherein said sulfonylurea is N-(p-tolylsulfonyl)-1,2,4,5-tetrahydro-3H-3-benzazepine-3-carboxamide.

5. A compound as defined in claim 2 wherein said sulfonylurea is N-(p-chloro-phenylsulfonyl)-1,2,4,5-tetrahydro-3H-3-benzazepine-3-carboxamide.

6. A compound as defined in claim 2 wherein said sulfonylurea is N-(p-fluoro-phenylsulfonyl)-1,2,4,5-tetrahydro-3H-3-benzazepine-3-carboxamide.

7. A compound as defined in claim 2 wherein said sulfonylurea is N-(p-methoxy-phenylsulfonyl)-1,2,4,5-tetrahydro-3H-3-benzazepine-3-carboxamide.

8. A compound as defined in claim 2 wherein said sulfonylurea is N-(p-ethoxy-phenylsulfonyl)-1,2,4,5-tetrahydro-3H-3-benzazepine-3-carboxamide.

9. A compound as defined in claim 2 wherein said sulfonylurea is N-(p-amino-phenylsulfonyl)-1,2,4,5-tetrahydro-3H-3-benzazepine-3-carboxamide.

10. A compound as defined in claim 2 wherein said sulfonylurea is N-(p-acetyl-phenylsulfonyl)-1,2,4,5-tetrahydro-3H-3-benzazepine-3-carboxamide.

11. A compound as defined in claim 2 wherein said sulfonylurea is N - (p-methylthio-phenylsulfonyl)-1,2,4,5-tetrahydro-3H-3-benzazepine-3-carboxamide.

12. A compound as defined in claim 1 wherein said sulfonylurea is N-(o-tolylsulfonyl)-1,2,4,5-tetrahydro-3H-3-benzazepine-3-carboxamide.

13. A compound as defined in claim 1 wherein said sulfonylurea is N-(m-chloro-phenylsulfonyl)-1,2,4,5-tetrahydro-3H-3-benzazepine-3-carboxamide.

14. A compound as defined in claim 1 wherein said sulfonylurea is N - (indan-5-yl-sulfonyl)-1,2,4,5-tetrahydro-3H-3-benzazepine-3-carboxamide.

15. A compound of the formula

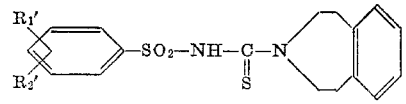

wherein $R_1'$ is hydrogen, halogen up to the atomic number 35, lower alkyl, lower alkoxy, lower alkylthio, lower alkanoyl, amino, lower akanoylamino, lower alkoxycarbonylamino, phenoxycarbonylamino, nitro, $R_2$ is hydrogen or $R_1$ and $R_2$ together is trimethylene or tetramethylene.

16. A compound as defined in claim 15 which is N-(p-tolylsulfonyl) - 1,2,4,5-tetrahydro - 3H-3-benzazepine-3-thiocarboxamide.

17. N-(p-nitrophenylsulfonyl)-1,2,4,5-tetrahydro-3H-3-benzazepine-3-carboxamide.

References Cited

UNITED STATES PATENTS 3,239,503    3/1966    Korger et al. _____ 260—239.6

ALTON D. ROLLINS, Primary Examiner

U.S. Cl. X.R.

260—252, 239.3, 239.6, 240, 294.7, 326.5, 397.7, 470, 502.6, 544, 545; 424—229, 244